United States Patent
Rembold et al.

[11] Patent Number: 5,829,688
[45] Date of Patent: Nov. 3, 1998

[54] INJECTION VALVE FOR DIRECTLY INJECTING FUEL INTO AN INTERNAL COMBUSTION ENGINE

[75] Inventors: Helmut Rembold, Stuttgart; Martin Mueller, Moeglingen; Christian Preussner, Markgroeningen, all of Germany

[73] Assignee: Robert Bosch GmbH, Stuttgart, Germany

[21] Appl. No.: 778,431

[22] Filed: Jan. 2, 1997

[30] Foreign Application Priority Data

Jan. 13, 1996 [DE] Germany .................. 196 01 019.5

[51] Int. Cl.⁶ ....................................... B05B 1/30
[52] U.S. Cl. ............................................. 239/585.1
[58] Field of Search ............................... 239/453, 460, 239/533.2–533.12, 585.1–585.5

[56] References Cited

U.S. PATENT DOCUMENTS

| | | | |
|---|---|---|---|
| 2,376,292 | 5/1945 | Tabb et al. ................. | 239/533.6 X |
| 3,450,353 | 6/1969 | Eckert ........................ | 239/453 X |
| 4,082,224 | 4/1978 | Mangus ...................... | 239/533.12 X |
| 4,164,326 | 8/1979 | Deckard ..................... | 239/453 X |
| 4,427,151 | 1/1984 | Trenne ....................... | 239/553.12 X |
| 4,513,916 | 4/1985 | Skinner ...................... | 239/533.9 X |
| 4,575,008 | 3/1986 | Kaczynski ................. | 239/533.11 X |
| 4,706,887 | 11/1987 | Harvey et al. ............. | 239/533.9 X |
| 5,058,549 | 10/1991 | Hashimoto et al. ....... | 123/298 |

FOREIGN PATENT DOCUMENTS

WO 93/23172  11/1993  WIPO .

*Primary Examiner*—Andres Kashnikow
*Assistant Examiner*—Steven J. Ganey
*Attorney, Agent, or Firm*—Kenyon & Kenyon

[57] ABSTRACT

The present invention relates to an injection valve, in particular to the injection valve for a direct injection of fuel into a combustion chamber of an internal combustion engine. The injection valve includes a valve body mounted in a housing, the valve body having a valve opening surrounded by a valve seat. A valve needle is provided with a closing head extending through the valve opening so that the closing head cooperates with the valve seat to snugly fit into valve seat on the injection discharge side. The valve needle is prestressed by a closing spring into a closing position and moved by an actuating mechanism through an actuating element against the force of the closing spring into an open position. To allow the injection valve to open quickly, the actuating element is closely engaged with the valve needle using a spring acting in the direction of the open position.

12 Claims, 4 Drawing Sheets

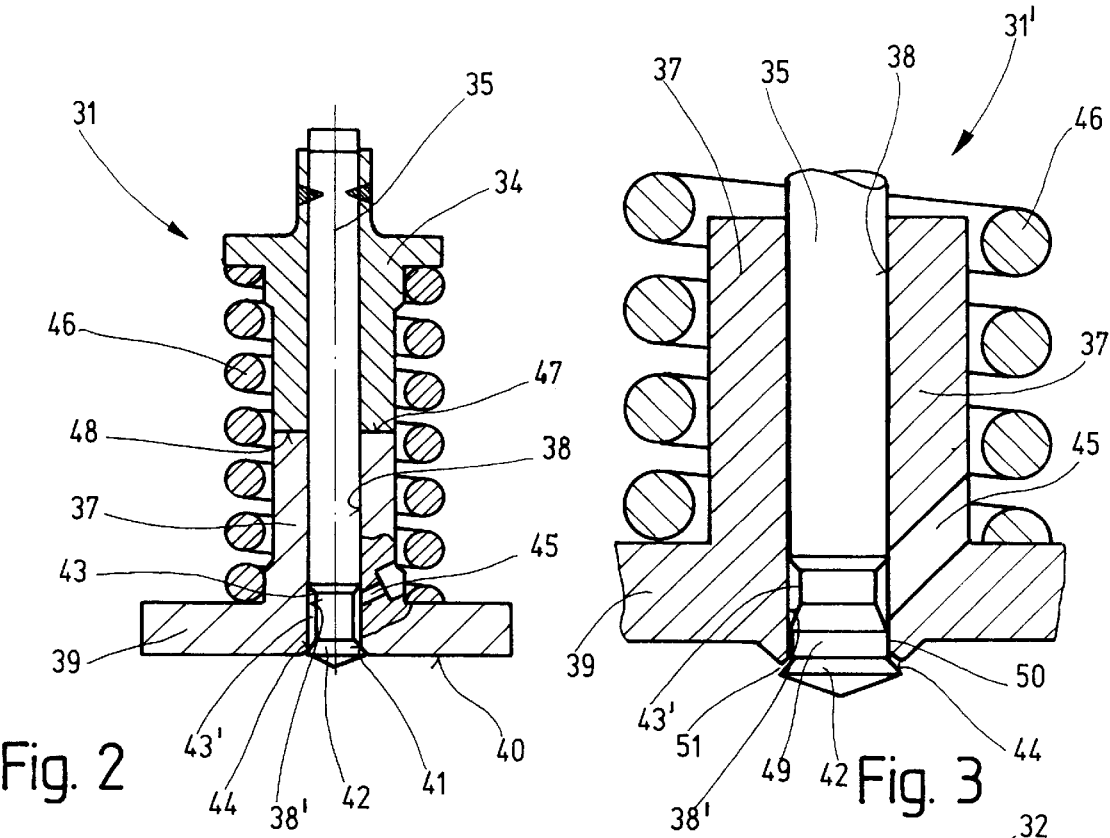
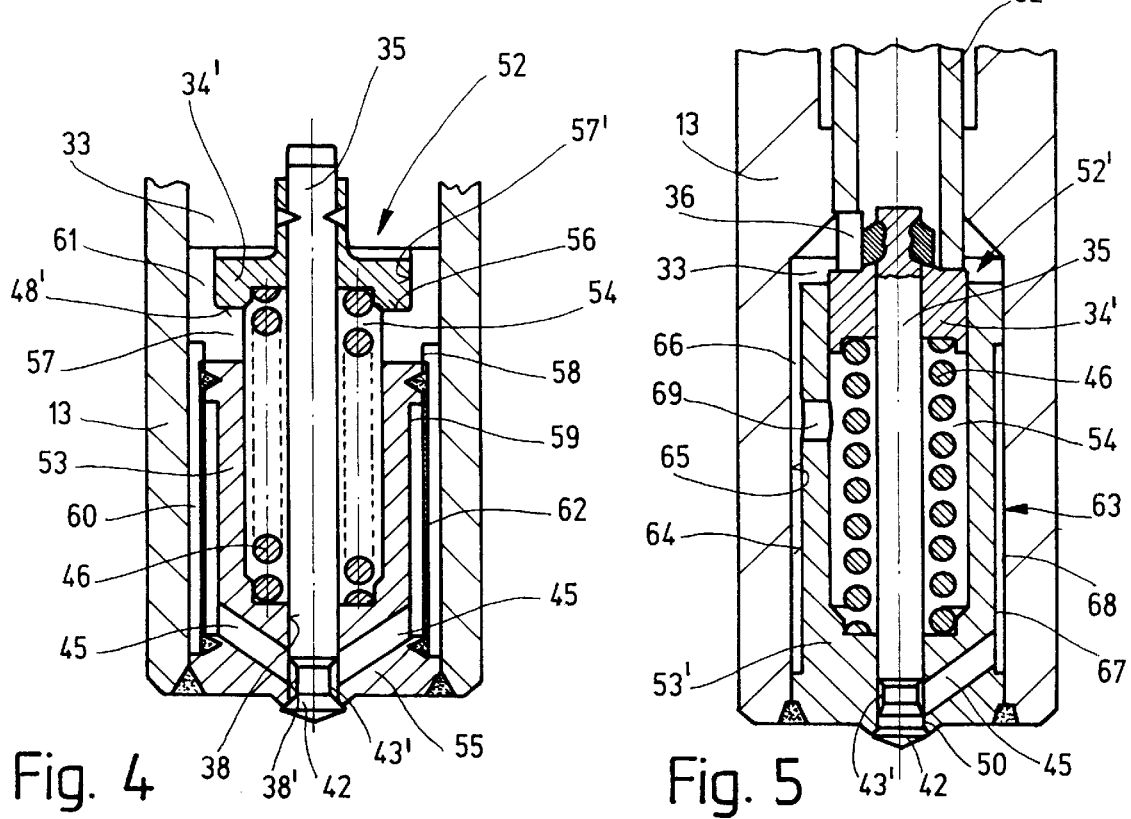

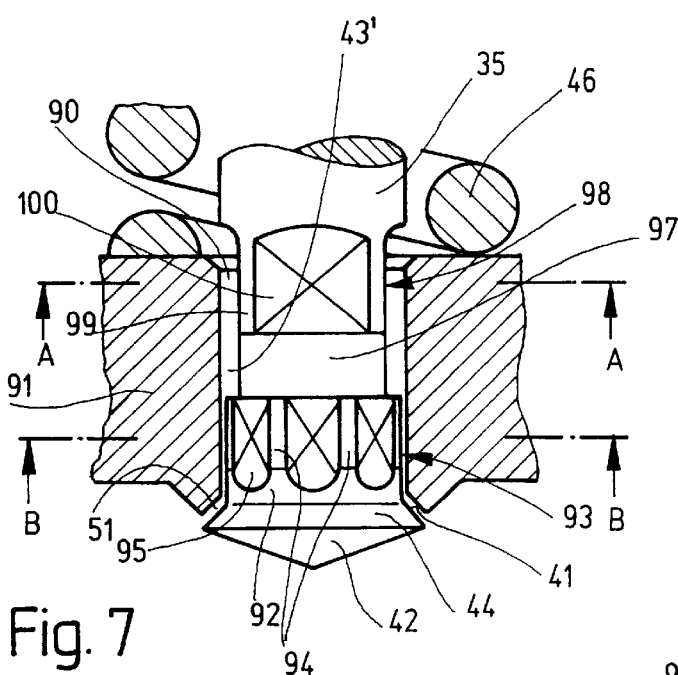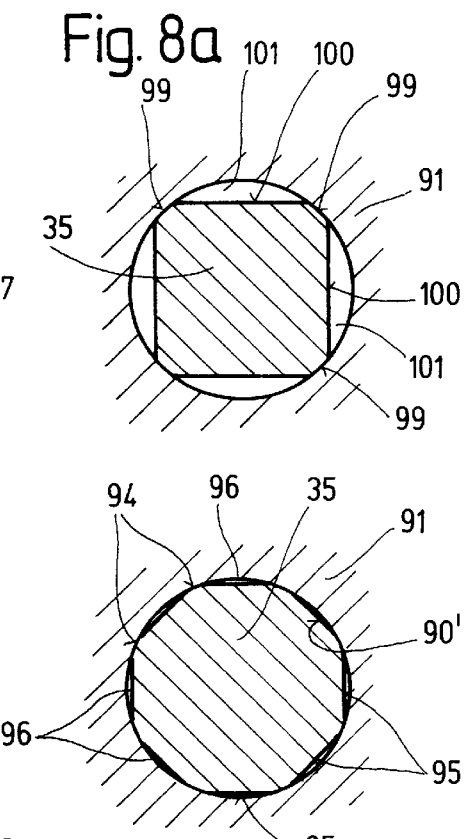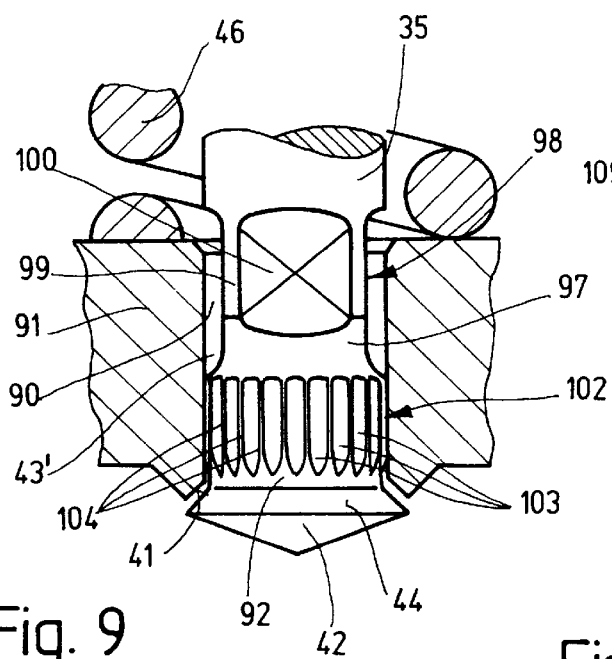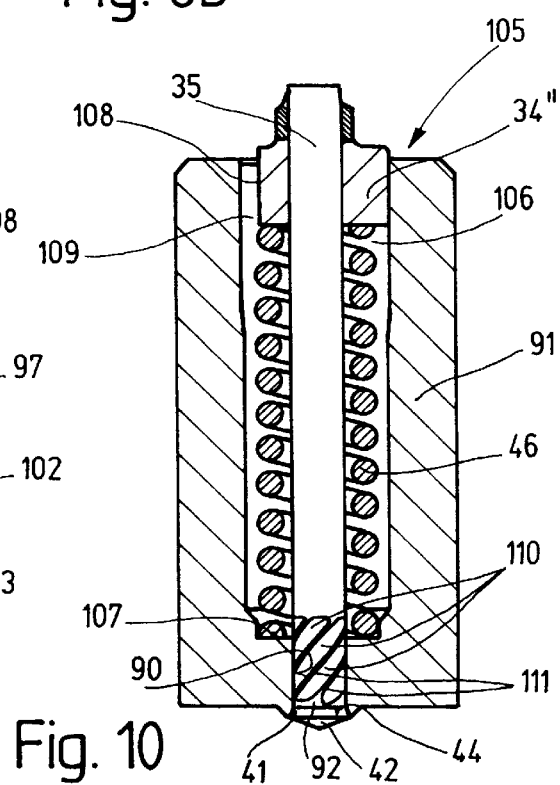

INJECTION VALVE FOR DIRECTLY INJECTING FUEL INTO AN INTERNAL COMBUSTION ENGINE

FIELD OF THE INVENTION

The present invention relates to an injection valve, in particular an injection valve for direct injection of fuel into the combustion chamber of an internal combustion engine.

BACKGROUND INFORMATION

International Application No. WO 93/23 172 describes a conventional injection valve for direct injection of fuel into the combustion chamber of an internal combustion engine which includes a valve body in a housing, with a valve opening surrounded by a valve seat on the injection discharge side and traversed by a valve needle provided with a closing head so that the closing head fits snugly into the valve seat from the outside. A closing spring fastened between the valve body and a spring sleeve attached to the valve needle pushes the valve needle against the direction of the injection into its closing position.

In International Application No. WO 93/23 172, an electromagnetic actuating mechanism is provided for opening the injection valve. The actuating mechanism, when energized, moves the valve needle against the force of the closing spring into its open position, so that an annular gap, serving as an injection discharge opening, is formed between the closing head and the valve seat.

The actuating mechanism includes a magnetic coil, on the side facing away from the valve body, there is provided an armature fastened to a diaphragm and held in the closed position by a spring. A force transmission tube fastened to the armature extends from the armature through the magnetic coil to the spring sleeve, and the end of the force transmission tube facing away from the armature is at an axial distance away from the spring sleeve when the injection valve is closed.

When this conventional injection valve opens, the armature is moved by the magnetic coil in the direction of the opening in a conventional manner. However, before the armature can affect the valve needle through the force transmission tube, the elastic force acting on the armature and between the force transmission tube and the spring sleeve must be overcome.

In the conventional injection valve described in International Application No. WO 93/23 172, the stroke determining the maximum width of the annular gap that forms the injection discharge opening is limited either by limiting the armature motion or, in the case of adjustment errors, by a spring sleeve stop on a guide element mounted on the valve body.

In another conventional injection valve described in U.S. Pat. No. 5,058,549, a valve needle with a closing head is mounted in a housing. The closing head has a guide section and an intake section with cylindrical guide surfaces and flat surfaces located between them forming intake gaps, as well as a conical sealing surface, which operates together with a valve seat arranged in front of an injection opening in the direction of the injection. A main injection opening and a secondary injection opening are located behind the valve seat in a dome-shaped section of the housing so that the fuel can be injected both into the main area of the combustion chamber and into the area where a spark plug is located.

In order to achieve a relatively even distribution and atomization of the injected fuel, jet atomizer means are assigned to the main injection opening. Either helicoidal grooves in the injection discharge opening wall or spray pins extending through the injection discharge opening with an external atomizer cone are provided as jet atomizer means. The injection valve described in U.S. Pat. No. 5,058,549, whose injection discharge area is exposed to the high temperatures prevailing in the combustion chamber is, however, very sensitive to deposits that may form in the injection openings, where they can have a considerable affect on reliable fuel delivery.

SUMMARY OF THE INVENTION

The injection valve according to the present invention is advantageous in that, when the valve opens, the valve needle starts its opening motion at the same time when the actuating motion of the actuating element begins. Therefore quick opening, being advantageous for accurate fuel delivery, and a substantially precise control of the injection time are achieved. The injection valve according to the present invention is also advantageous in that the actuating mechanism must overcome only the force of the closing spring, which is necessary for effective sealing of the injection valve.

When the injection valve is closed, only the small mass of the valve needle is stopped at the valve seat, while the actuating element continues to move until, depending on the strength of the spring holding it in the open position, it is fully or partially stopped by the spring. A relatively weak spring is advantageous in that the actuating element is then brought into engagement again with the valve needle at a relatively low speed, so that the valve cannot accidentally open.

The injection valve according to the present invention is cost-effective and simple to manufacture. The precise guidance for the actuating element results from the tube-shaped design of an extension piece connected to the armature of an electromagnetic actuating mechanism, guided in a tube-shaped outlet part of the housing.

The design of a cylindrical delivery gap is advantageous in that the fuel delivery is independent of the opening stroke of the valve needle, so that relatively loose tolerances are permissible, thus making the manufacture and assembly of the injection valve simple, therefore contributing to reducing its cost. In addition, a special stop for the valve needle can be omitted, which further simplifies the valve unit surrounding the valve needle and the valve body.

Furthermore, the injection valve according to the present invention is also less prone to scaling due to the cylindrical delivery gap, since it is constantly washed, and the injection discharge opening formed between the valve seat and the closing head can be designed to prevent dirt particles from being deposited there.

The scaling tendency can be further reduced by the filtering device provided according to the present invention.

The design of a plurality of parallel delivery gaps, jointly defining a preferably cylindrical surface forming a delivery cross section has not only the advantage of virtually preventing dirt particles from depositing, but also of influencing the distribution of the fuel injected into the combustion chamber of an internal combustion engine so that a portion of the injected fuel penetrates more deeply into the combustion chamber and the fuel is better distributed in the combustion chamber.

BRIEF DESCRIPTION OF THE DRAWINGS

FIG. 2 shows an enlarged schematic section of the valve unit of the injection valve as illustrated in FIG. 1.

FIG. 3 shows a schematic section of a valve body provided at a valve opening with a valve needle in its open position.

FIG. 4 shows a schematic section of a valve unit in a housing with an integrated filter.

FIG. 5 shows a schematic section of a valve unit in the housing with another integrated filter.

FIG. 7 shows a schematic section of a valve body provided at the valve opening according to another embodiment of the present invention.

FIG. 8a shows a section along line A—A of FIG. 7.

FIG. 8b shows a section along line B—B of FIG. 7.

FIG. 9 shows a schematic section of a valve body provided at the valve opening according to yet another embodiment of the present invention.

FIG. 10 shows a schematic section of another valve unit representing an injection valve according to the present invention.

DETAILED DESCRIPTION

Figure 1:
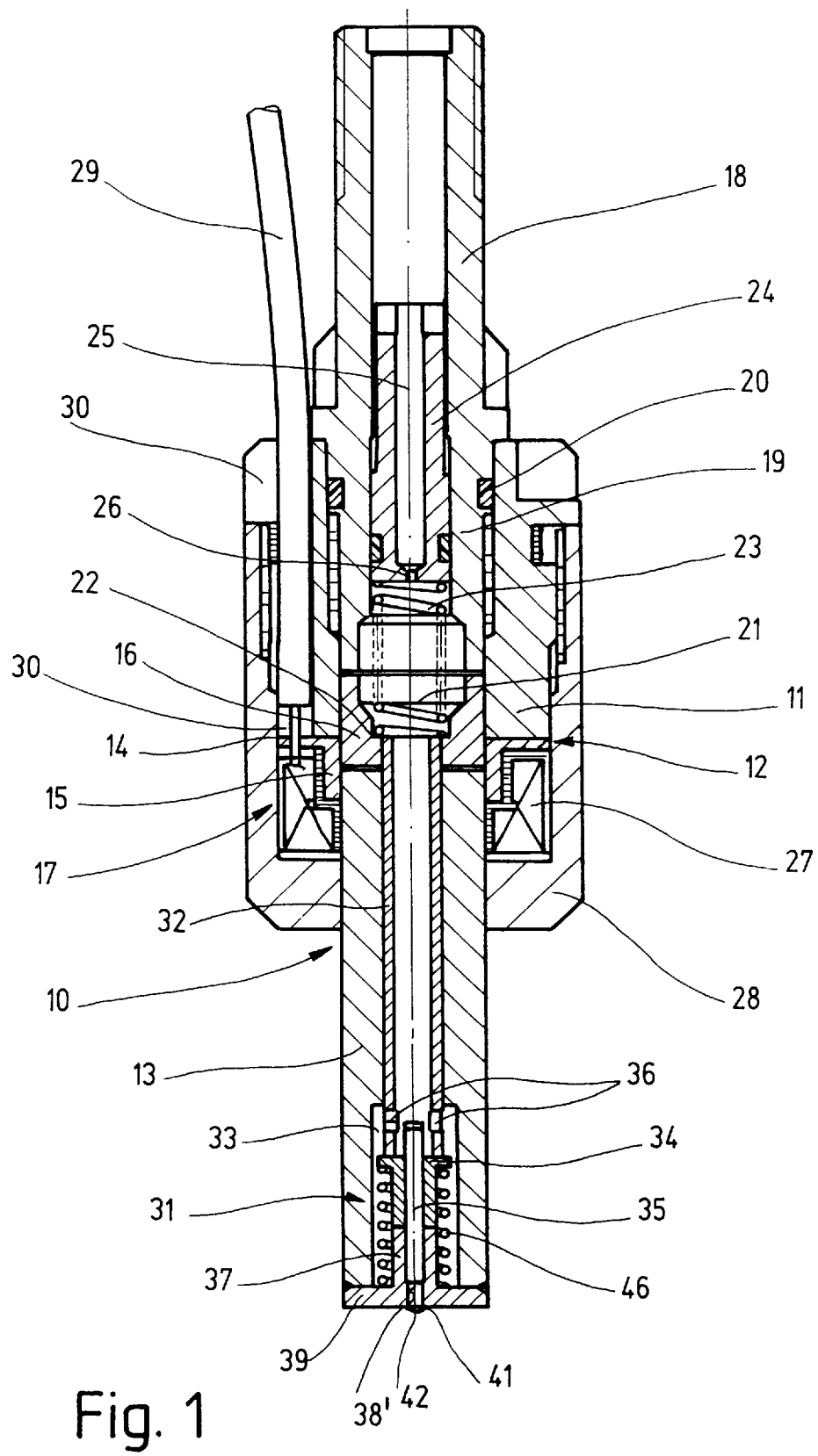
FIG. 1 shows a schematic section of an injection valve with a valve unit according to the present invention.

In FIG. 1, an injection valve includes a housing 10 with a substantially sleeve-shaped housing body 11 made of soft magnetic material, a non-magnetic intermediary ring 12, and a tube-shaped outlet part 13. Intermediary ring 12 is attached (e.g., soldered) to the outlet side surface of housing body 11 with a radial flange 14, and has a sleeve-shaped section 15. The tube-shaped outlet part 13 is fitted in the sleeve-shaped section 15 and attached thereto (e.g., through soldering) so that it is arranged at a distance from housing body 11 in the longitudinal direction thereof.

An armature 16 of an electromagnetic actuating mechanism 17 is fitted in housing 10 so that it is movably guided in the longitudinal direction of housing body 11. A substantially tube-shaped connecting piece 18 for a fuel line (not illustrated here) is set in housing body 11 with first end section 19 on the side facing away from outlet part 13 and fastened (e.g., screwed) therein. A seal 20 is provided between the first end section 19 of connection piece 18 and housing body 11 for a leakproof connection.

Armature 16 has a through bore 21, on whose inner periphery a support shoulder 22 is provided, supporting spring 23 set with one end into through bore 21. The other end of spring 23 extends into connection piece 18 and is supported by a spring adjustment sleeve 24 provided in connection piece 18; spring adjustment sleeve 24 is provided in connection piece 18 and has a through channel 25 with a throttle valve 26. Throttle valve 26 allows the resistance to fuel flow of the assembled injection valve to be modified.

A magnetic coil 27 of electromagnetic actuating mechanism 17 is pushed onto outlet part 13 and partially on intermediary ring 12 and secured in its position by cap 28, fitted through outlet part 13 and attached to housing body 11. Cap 28 guides the magnetic return flow between outlet part 13 and housing body 11. An electrical connecting cable 29 for magnetic coil 27 traverses feed-through element 30 in housing body 11.

To transmit a force acting upon armature 16 to a valve unit 31 when magnetic coil 27 is energized, armature 16 is connected to an extension piece 32, guided in outlet part 13, extending through outlet part 13 into a cylindrical recess 33 in valve unit 31. In order to avoid a magnetic short-circuit between armature 16 and outlet part 13, tube-shaped extension piece 32 is made of non-magnetic (e.g., austenitic) material.

Tube-shaped extension piece 32 engages a valve needle 35 with its end facing away from armature 16 through a spring sleeve 34, and has, at its end extending into recess 33, radial openings 36, through which fuel can flow from the injection valve into recess 33 when the injection valve is operating. As shown in FIG. 2, valve unit 31 has a valve body 37 including a guide bore 38, through which valve needle 35 extends, and a radial flange 39 with which valve body 37 is attached (e.g. welded) to outlet part 13. Valve unit 31 can also be attached to outlet part 13 by other methods (e.g., through crimping or threading). Guide bore 38 in valve body 37 ends in outlet side face 40 of valve body 37 and forms valve opening 38' there, surrounded by a valve seat 41.

Valve needle 35 has a closing head 42 on its outlet side, with an annular groove 43 peripherally encircling valve needle 35, and having on its side facing away from the injection discharge side a substantially spherical sealing surface 44 opposite valve seat 41, which sealing surface 44 snugly fits closing head 42 when the injection valve is closed. Annular groove 43, operating with valve seat 41, forms, with the inner wall of valve opening 38', an annular channel 43', connected to recess 33 through an inlet bore 45 in valve body 37.

In order to prestress valve needle 35 into its closing position shown in FIGS. 1 and 2, a closing spring 46 is mounted on an axial section of valve body 37 between flange 39 and spring sleeve 34. The maximum opening stroke of valve needle 35 results from the distance between face 47 provided on valve body 37 as a stop for spring sleeve 34 and the opposite face 48 on spring sleeve 34.

When valve unit 31 is assembled, valve needle 35 is inserted in the guide bore 38 from what is to become the combustion chamber or injection discharge side. Then closing spring 46 is pushed onto valve body 37 and subsequently spring sleeve 34 is pushed onto valve needle 35. In order to adjust the stroke, valve needle 35 and spring sleeve 34 are pushed against one another up to the desired stroke length and then welded together on the end facing away from closing head 42. The valve unit 31, thus pre-assembled, can then be inserted in recess 33 in outlet part 13 of housing 11 as a complete subassembly and fastened (e.g., by welding or crimping).

When the injection valve according to the present invention is operated, closing spring 46 holds closing head 42 with its sealing surface 44 against valve seat 41 when the injection valve is closed. At the same time, armature 16 and extension piece 32 attached to it are pushed in the direction of the valve opening by spring 23, which is weaker than closing spring 46, so that extension piece 32, with its end facing away from armature 16, snugly fits into spring sleeve 34. When magnetic coil 27 is energized to open the injection valve, a valve opening force, immediately transmitted from armature 16 through extension piece 32 and spring sleeve 34 to valve needle 35, is produced. Thus the injection valve is opened. The fuel to be directly injected into a combustion chamber flows through connection piece 18, connecting channel 25 of spring adjustment sleeve 24, throttle valve 26, through bore 21 in armature 16, tube-shaped extension piece 32, and openings 36 into recess 33 of holding valve unit 31. The fuel goes from recess 33 through intake bore 45 to annular channel 43' and therefrom through the annular gap, formed by valve seat 41 and sealing surface 44, serving as the delivery gap, which also forms the injection discharge opening of the injection valve into the combustion chamber.

After magnetic coil 27 is de-energized, the magnetic force no longer acts upon armature 16, and closing spring 46 presses valve needle 35 with spring sleeve 34, as well as extension piece 32 and armature 16, into the closing position. As soon as valve needle 35 contacts, with its closing head 42, valve seat 41, the closing motion of valve needle 35 and spring sleeve 34 stops. Extension piece 32 and armature 16 continue to move, however, by inertia, are slowed down by spring 23, and may be stopped by the surface facing armature 16 of connecting piece 18. Subsequently spring 23 moves armature 16 and extension piece 32 in the direction of opening again until extension piece 32 again contacts spring sleeve 34.

For this purpose, it is sufficient to use a relatively weak spring 46, since then armature 16 is moved back slowly into its normal position with the injection valve closed, where extension piece 32 connected with armature 16 snugly fits into spring sleeve 34.

Extension piece 32, connected to armature 16, is then held tightly against spring sleeve 34 until the next opening of the injection valve.

Thus, it is ensured that a motion of armature 16 in the direction of opening is transmitted to valve needle 35 without any play, while a closing motion of armature 16 and extension piece 32 attached thereto does not need to be slowed down at valve seat 41. Thus only the relatively small mass of valve needle 35 and spring sleeve 34 hits valve seat 41.

Valve seat 41 only has a small damping action, which is advantageous in that any wear of valve seat 41 and the mating sealing surface 44 can be kept low and the rebound of valve needle 35 can be prevented. Limiting the mechanical stress on valve seat 41 and mating sealing surface 44 is especially important here, since the valve seat is exposed to high temperatures due to its location in or near the combustion chamber.

Accordingly, face 47 opposite spring sleeve 34 of valve body 37 forming the valve needle stroke stop is located near valve seat 41; therefore, different thermal expansions of valve needle 35 and valve body 37 result in very small variations in the stroke, so that even a very small stroke (e.g., of 30 µm) required for accurate and constant fuel delivery, can be steadily maintained in operation.

In valve unit 31' shown in FIG. 3, a cylindrical shoulder 49 is provided on valve needle 35 between sealing surface 44 and annular groove 43, which shoulder, together with valve opening 38' forms a narrow cylindrical annular gap 50 in flange 39, serving as a fuel delivery gap when the injection valve is open, while annular gap 51 delimited by valve seat 41 and sealing surface 44 determines the cone angle of injection.

It is advantageous that the fuel delivery adjustment set on annular gap 50 be virtually independent of the stroke and that the annular gap 51 between valve seat 41 and sealing surface 44 serving as an injection discharge opening could be enlarged without affecting fuel delivery, so that the danger of a non-closing injection valve resulting from dirt particles being lodged between valve seat 41 and sealing surface 44 can be at least substantially reduced, if not completely eliminated.

FIG. 4 shows another valve unit 52 with a pot-shaped valve body 53 having a spring chamber 54, at whose bottom 55 guide bore 38 for valve needle 35, forming valve opening 38', as well as intake bores 45 ending in annular channel 43', are provided. Spring chamber 54, on the side facing away from guide bore 38, turns into shoulder 56 serving as a stop surface for spring sleeve 34', as a stroke stop, and ends in a guide section 57 with a inner guide surface 57' for spring sleeve 34' which works, with the radially outer face 48', together with shoulder 56.

Valve body 53 has, around its outer circumference, a first peripheral recess 58, in whose area a second peripheral recess 59 is provided on valve body 53. Both recesses 58, 59 form a fuel intake area 60, connected to the inlet area of recess 33 in outlet part 13 through axial channels 61. On the peripheral surface of the first recess 58, a filter 62 covering the second recess 59 is mounted so that the fuel coming through extension piece 32 (not shown in FIG. 4), recess 33, outlet part 13, and channel 61 is filtered again in intake area 60 prior to flowing from the area of the second recess 59 in valve body 53 through intake bores 45 to annular channel 43'. Filter 62 may consist of filter tissues and it may be glued or welded on.

In valve unit 52' shown in FIG. 5, the delivery gap is formed by a cylindrical annular gap 50, as described using FIG. 3. Therefore no stroke stop for valve needle 35 is needed here.

A disk filter 63 is provided in valve unit 52' for additional filtering of the fuel shortly before it reaches the cylindrical annular gap 50 serving as a delivery gap; the filter is formed by a suitably designed, basically cylindrical outer surface 64 of valve body 53' and an inner surface 65 of recess 33 in outlet part 13, working together with the outer surface. Outer surface 64 of valve body 52' has first channels 66, through which the fuel flows from the inlet area of recess 33 to outlet area 13, and second channels 67, which collect the fuel and guide it to intake bore 45.

The outer diameter of valve body 53' is smaller along channels 67 than the inner diameter of recess 33, so that a smaller filtering gap 68 is formed, through which the fuel flows while it is filtered. The first and second channels 66, 67, shown axially in FIG. 5, can be extended by arranging the first and second channels 66, 67 in a helicoidal form on outer surface 64 of valve body 53'.

An opening 69 connects spring chamber 54 in valve body 53' to one or more of first channels 66, so that the fuel pumped by the opening or closing motion of valve needle 35 can flow from spring sleeve 34' into and out of spring chamber 54.

In the injection valves according to the present invention as described above, the injection angle of the fuel is determined by the cone angle of the basically truncated cone-shaped annular gap between valve seat 41 and sealing surface 44 on closing head 42 of valve needle 35, since intake bores 45 run in planes that are radial in relation to the longitudinal axis of the injection valve.

It is, however, also possible to have intake bores 45 end tangentially or at least with a tangential component in annular channel 43', so that the fuel particles exiting through annular gap 51 between valve seat 41 and sealing surface 44 have a velocity component in the peripheral direction. In this case, either a greater cone angle of injection can be achieved with unchanged cone angle of annular gap 51 or the cone angle of annular gap 51 can be reduced for the same angle of injection. The latter alternative has the advantage that the valve needle stroke can be increased so that possible changes in the stroke have less influence on fuel delivery when annular gap 51 serves as a delivery gap.

Figure 6:
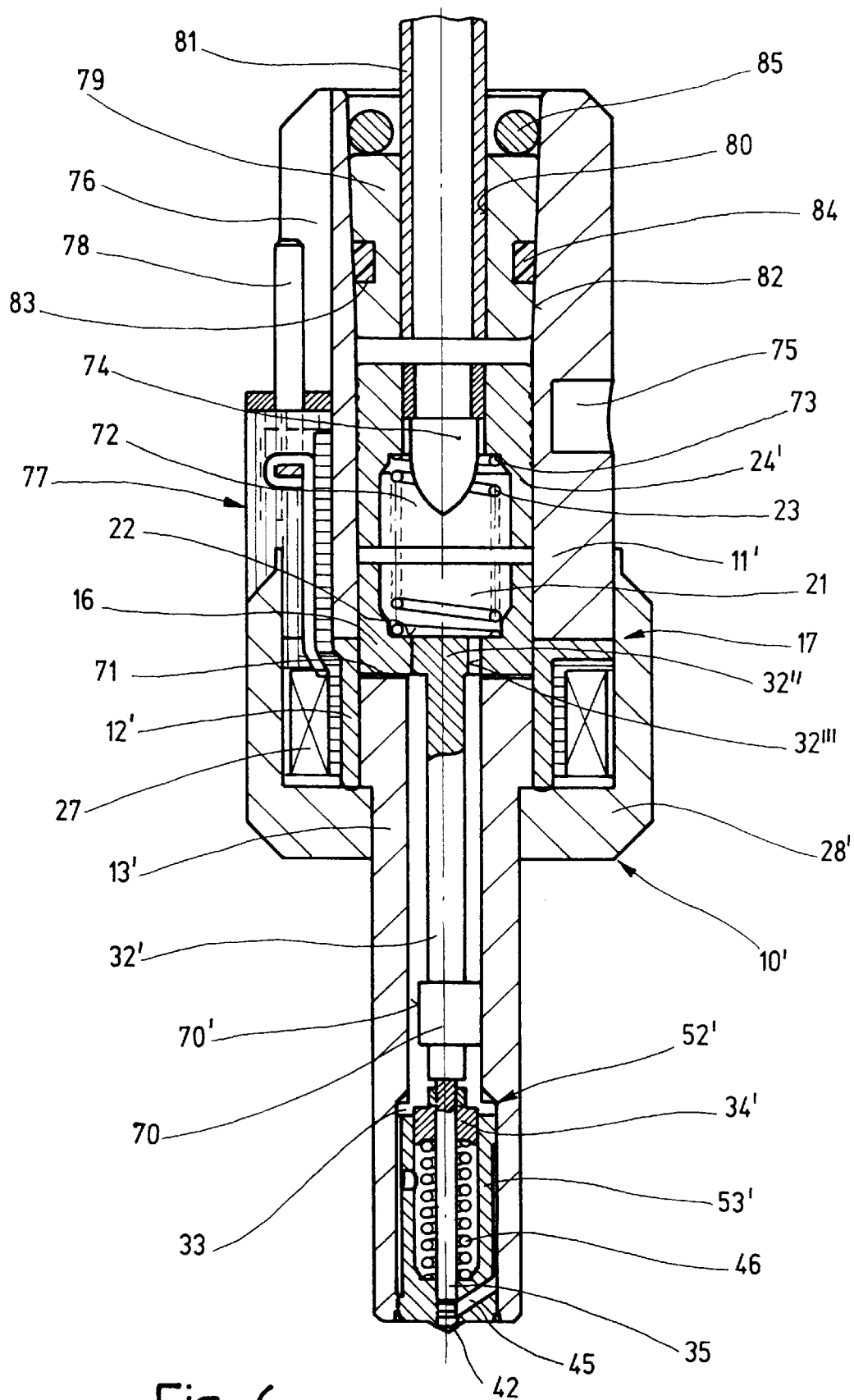
FIG. 6 shows a schematic section of another injection valve according to the present invention.

FIG. 6 shows another injection valve according to the present invention with a housing 10' comprising a basically sleeve-shaped housing body 11' made of soft magnetic material, a non-magnetic intermediary ring 12' soldered thereto, a tube-shaped outlet part 13' fastened in intermediary ring 12', and a cap 28' pushed onto outlet part 13'. Tube-shaped outlet part 13' has, at its outlet side end, a cylindrical recess 33, where a valve unit 52' is mounted as explained previously in connection with FIG. 5.

An armature 16 of an electromagnetic actuating mechanism 17, having a through bore 21, is movably guided in housing body 11' in the longitudinal direction of said housing body and is connected to a rod-shaped extension piece 32', seated in through bore 21 of armature 16 with a widening 32" on the armature side. Extension piece 32' has, near its end facing away from armature 16, a guide collar 70 guiding extension piece 32 in outlet part 13'. The guide surfaces on armature 16 and housing body 11' are chrome-plated for this purpose.

Widening 32" and guide collar 70 are provided with one or more polished sections 32''' and 70', respectively. Thus, when the injection valve is operated, fuel can flow through bore 21 past polished surface 32''' on widening 32" into tube-shaped outlet part 13' and therefrom to recess 33. Instead of polished surfaces 32''', 70', axial through recesses (e.g., longitudinal grooves or flutes) can also be provided.

Extension piece 32', extending through tube-shaped outlet part 13' to the area of recess 33, engages there with a valve needle 35.

The maximum opening stroke of valve needle 35 is determined by a gap 71 between the opposite faces of armature 16 and outlet part 13', formed when armature 16 is kept engaged with valve needle 35 through extension part 32' and spring sleeve 34' with the injection valve closed. These two faces are also chrome-plated for this purpose and form a wear-resistant stop. The opening stroke of valve needle 35 can be adjusted by moving valve unit 52' during assembly or using extension pieces 32, 32' of different lengths.

A spring 23, pressing armature 16 with extension piece 32' in the direction of valve opening against valve needle 35 with the injection valve closed, and whose elastic force is considerably smaller than the elastic force of closing spring 46 provided in valve unit 52', is supported, at one of its ends, by a support shoulder 22 provided in through bore 21. The other end of spring 23 extends into a stepped through bore 72 of a spring adjustment sleeve 24' provided in housing body 11' and is in contact there with a shoulder 73. A filter 74 is provided in stepped bore 72.

In order to adjust the elastic force exerted by spring 23 upon armature 16, spring adjustment sleeve 24' is moved in housing body 11' and subsequently secured by a pocket hole 75.

A magnetic coil 27 of electromagnetic actuating mechanism 17 is pushed onto intermediary ring 12' and secured in its position by cap 28'. A plug 77 with contact pin 78 is provided as an electrical connection for magnetic coil 27 in a longitudinal groove 76 in housing body 11'. Magnetic coil 27 can, however, also be electrically connected using a cable length provided in longitudinal groove 76 or in some other suitable manner.

A connecting plug 79 with a cylindrical through bore 80, in which a fuel feed tube 81 is fastened, preferably by soldering, has a conical external surface 82 with a small cone angle, where a peripheral annular groove 83 is provided for the placement of a seal 84. Connecting plug 79 is seated on the inlet side into housing body 11' and secured by a U-shaped wire clamp 85. In this way fuel feed tube 81 is attached to the injection valve in a cost-effective and, mainly, compact manner, which is advantageous considering the space restrictions on the cylinder head of an internal combustion engine.

FIGS. 7, 8a, and 8b show another embodiment of a valve needle 35 according to the present invention, extending through a valve opening 90 in a valve body 91 and held by a closing spring 46 in its closed position, in which it snugly fits into valve seat 41 with its sealing surface 44 provided on its closing head 42. Valve needle 35 has a groove 92 next to sealing surface 44, which groove is adjacent, in the direction of the end facing away from closing head 42 of valve needle 35, to a step 93, which has alternatively annular-cylindrical guide surfaces 94 and flat surfaces 95 on its outer peripheral surface, forming delivery gaps 96 (FIG. 8b). Delivery gaps 96 jointly form the narrowest flow passage of the injection valve where the stream of fuel is accelerated for proper atomization in the combustion chamber. As shown in FIG. 8b, for example, eight flat surfaces 95 are provided for forming delivery gaps 96, with guide surfaces 94 guided on inner peripheral surface 90' of valve opening 90 between them.

Upstream, a fuel collecting groove 97, is adjacent to step 93 of valve needle 35, forming annular channel 43'; the fuel collecting groove 97 is followed by an intake section 98 with additional cylindrical guide surfaces 99 and flat surfaces 100 between them forming intake gaps 101. Four flat surfaces 100 with a corresponding number of guide surfaces 99 are formed on intake section 98, as shown in FIG. 8a.

With the valve open, fuel flows from the area of closing spring 46 through intake gap 101 into annular channel 43' and therefrom through delivery gap 96 and groove 92 to the annular gap 51 between valve seat 41 and sealing surface 44 forming the injection discharge opening. Eight individual fuel jets flow into groove 92; they are partly joined again in groove 92 and in conical annular gap 51 between valve seat 41 and sealing surface 44, where they are deflected so that the fuel is injected as a closed hollow conical jet. This hollow conical jet has fluctuations in density around its periphery, which results in that the denser portions of the fuel jet penetrate the combustion chamber more deeply during injection.

The special design of this valve needle 35 has the advantage that particularly the flat surfaces 95 delimiting delivery gap 96 can be produced very accurately, since they can be polished, for example, together with other round surfaces such as guide surfaces 94, 99 in a single machining process. Furthermore, the valve needle 35 does not tend to be affected by deposits forming due to the high temperatures in the immediate proximity of the combustion chamber which may result in seizing of the valve needle in the valve body, since the contact surfaces between valve needle 35 and valve body 91 are limited to the narrow guide surfaces 94 and 99. As these guide surfaces 94, 99, glide on the inner surface of valve opening 90 when the valve is operated, any deposits are scraped off and washed out by the fuel stream.

FIG. 9 shows another valve needle 35 for a valve unit according to the present invention that is insensitive to dirt and deposits. The valve needle 35 of FIG. 9 differs from the valve shown in FIG. 7 in that a step 102 is provided between groove 92 adjacent to sealing surface 44 and fuel collecting groove 97 forming annular channel 43 ' with the inner wall of valve opening 90; this step 102 is provided, on its outer peripheral surface, with a plurality of axial grooves 103 separated by narrow guide webs 104, which jointly determine the delivery cross section. The injected, hollow cone-shaped fuel jet can be made as smooth as desired through the number and cross section shape of axial grooves 103.

In particular, with the valve needle 35 as shown in FIG. 9, it is not necessary that the individual axial grooves 103 have identical designs; so, for example, some of the axial grooves 103 can be designed with a larger cross section so that areas of the injected hollow cone jet have a relatively greater thickness, which results in a particularly deep fuel injection into the combustion chamber.

Axial grooves 103 can be manufactured through electro-erosion or electrochemical etching.

FIG. 10 shows another embodiment of a valve unit 105 according to the present invention with a valve body 91, having a bore 106 to accommodate closing spring 46; the bore ends in valve opening 90 through a support surface 107. Closing spring 46 is mounted between this support surface 107 and a spring sleeve 34" welded to valve needle 35, prestressing valve needle 35 in the direction of closing and holding its closing head 42 with its sealing surface 44 tightly on valve seat 41 in the closed position. Spring sleeve 34" has a recess 108 extending over its entire axial length, which can be designed, e.g., as a polished surface or a longitudinal groove, forming an intake gap 109, through which fuel can flow into bore 106 and to valve opening 90.

The section of valve needle 35 adjacent to the side of groove 92 facing away from closing head 42 and located in valve opening 90 has a plurality of helicoidal grooves 110, separated by guide webs 111 working together with the inner surface of valve opening 90. With the helicoidal grooves 110 not only is it achieved that the exiting fuel jet has a definite velocity component in the peripheral direction, but valve needle 35 is also better guided in the valve opening by helicoidal guide webs 111.

Due to the oblique entry of fuel into groove 92, located upstream from sealing surface 44, due to the helicoidal design of grooves 110, a relatively even distribution of fuel in the peripheral direction is achieved.

The helicoidal design of grooves 110 and guide webs 111 improves the removal of any deposits formed, so that this design of valve needle 35 reduces the sensitivity of valve unit 105 to deposits. Another advantage consists of the fact that the helicoidal grooves 110 can be made deeper for the same delivery cross section than the axial grooves, so that valve unit 105 is even less affected by deposits.

When the valve unit 105 is operated in an injection valve, as shown, for example, in FIG. 1 or FIG. 6, valve needle 35 is pressed by electromagnetic actuating mechanism 17 in the direction of opening, so that closing head 42 with its sealing surface 44 is lifted from valve seat 41. The opening stroke of valve needle 35 is not critical in this case for accurate fuel delivery, since the annular gap formed between sealing surface 44 and valve seat 41 as the injection valve opens has no metering function, but only serves to form the jet. The stroke of valve needle 35 can therefore be limited by a stop for armature 16 of electromagnetic actuating mechanism 17 as in the injection valve according to FIG. 6.

What is claimed is:

1. An injection valve for directly injecting a fuel into a combustion chamber of an internal combustion engine, comprising:
    a housing;
    a valve body mounted in the housing and including a valve opening, the valve opening having an injection side and surrounded by a valve seat to form an injection opening;
    a valve needle including a closing head and extending through the valve opening, the closing head snugly fitting into the valve seat on the injection side when the injection valve is in a closed position;
    a first spring springly maintaining the valve needle in the closed position;
    a magnetic coil;
    an actuating arrangement electromagnetically actuating the injection valve by extending the valve needle into an open position against a force of the first spring, the actuating arrangement including an armature the armature being fixedly connected to the valve needle via an extension piece and being moved in response to an actuation by the magnetic coil the armature having a contact side facing away from the valve needle; and
    a second spring biased in the open position when the injection valve is in the closed position, the actuating arrangement tightly engaging with the valve needle using the second spring;
    wherein the second spring acts on the armature on the contact side of the armature.

2. The injection valve according to claim 1, wherein the extension piece has a tube-shape or a rod-shape.

3. The injection valve according to claim 2, wherein the extension piece is guided in a tube-shaped outlet part of the housing.

4. The injection valve according to claim 1, further comprising:
    a spring sleeve coupled to the valve needle and contacted by the first spring, the spring sleeve having a first surface for cooperating with a second surface, the second surface provided on the valve body for limiting a stroke of the internal combustion engine.

5. The injection valve according to claim 1, wherein the valve opening includes an inner wall, and wherein the valve needle has a peripherally running groove substantially near the closing head, the peripherally running groove and the inner wall forming an annular channel, the annular channel positioned substantially near a delivery cross section toward an injection discharge direction.

6. The injection valve according to claim 5, wherein the closing head includes a sealing surface, and wherein the delivery cross section is formed by a conical annular gap, the conical annular gap formed between the valve seat and the sealing surface when the injection valve is in the open position.

7. The injection valve according to claim 5, wherein the valve needle includes a cylindrical member having an outer surface, and wherein the delivery cross section is formed by a cylindrical annular gap, the cylindrical annular gap delimited by the outer surface and the inner wall of the valve opening.

8. The injection valve according to claim 5, wherein the delivery cross section is formed by a plurality of cylindrically arranged delivery gaps.

9. The injection valve according to claim 8, wherein the valve needle includes a plurality of helicoidal grooves forming delivery gaps.

10. The injection valve according claim 5, wherein the valve body includes at least one intake bore defined by an annular channel having a tangential component.

11. The injection valve according to claim 10, further comprising:
    a filtering element situated upstream from the at least one intake bore delimited by the annular channel, the filtering element cooperating with the valve body.

12. The injection valve according to claim 11, wherein the filtering element includes a disk filter, and wherein valve body includes an outer surface, and the housing includes an inner surface, the outer surface and the inner surface forming a recess.

* * * * *

UNITED STATES PATENT AND TRADEMARK OFFICE
CERTIFICATE OF CORRECTION

PATENT NO. : 5,829,688
DATED : November 3,1998
INVENTOR(S) : Rembold et al.

It is certified that error appears in the above-identified patent and that said Letters Patent is hereby corrected as shown below:

Column 7, line 15, change "32" to --32'--.

Signed and Sealed this

Twenty-seventh Day of July, 1999

Attest:

Q. TODD DICKINSON

*Attesting Officer*  *Acting Commissioner of Patents and Trademarks*